(12) United States Patent
Alwan et al.

(10) Patent No.: US 6,271,139 B1
(45) Date of Patent: Aug. 7, 2001

(54) POLISHING SLURRY AND METHOD FOR CHEMICAL-MECHANICAL POLISHING

(75) Inventors: James J. Alwan; Craig M. Carpenter, both of Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/109,003

(22) Filed: Jul. 1, 1998

Related U.S. Application Data

(60) Provisional application No. 60/051,520, filed on Jul. 2, 1997.

(51) Int. Cl.[7] .................................................... H01L 21/02
(52) U.S. Cl. ............................ 438/692; 438/693; 438/20; 445/51
(58) Field of Search ..................................... 438/692, 693, 438/20; 445/51

(56) References Cited

U.S. PATENT DOCUMENTS

| | | | |
|---|---|---|---|
| 4,708,805 | * | 11/1987 | D'Muhala ........................ 134/22.14 |
| 5,229,331 | * | 7/1993 | Doan et al. ........................... 156/644 |
| 5,329,207 | * | 7/1994 | Cathey et al. ......................... 445/24 |
| 5,653,619 | * | 8/1997 | Cloud et al. ........................... 445/24 |
| 5,769,689 | * | 6/1998 | Cossaboon et al. ................... 451/41 |

* cited by examiner

*Primary Examiner*—Robert Kunemund
(74) *Attorney, Agent, or Firm*—Dorsey & Whitney LLP

(57) ABSTRACT

A method for polishing a grid of a field emission display (FED) with a polishing slurry contain very small particle of colloidal particles of amorphous silica in an alkaline medium. The method results in highly selective planarization well-suited for chemical-mechanical polishing (CMP) of the grid for the self-aligned CMP-FED fabrication process. An FED grid made according to this method is also disclosed.

11 Claims, 4 Drawing Sheets ns formed in multiple layers of materials. One type of microelectronic device particularly relevant to the present invention is a field emission display ("FED").

POLISHING SLURRY AND METHOD FOR CHEMICAL-MECHANICAL POLISHING

This application claims benefit to Provisional Application No. 60/051,520 filed Jul. 2, 1997.

TECHNICAL FIELD

The present invention relates to a polishing slurry and method for using the same in chemical-mechanical polishing, particularly in the fabrication of field emission displays.

BACKGROUND OF THE INVENTION

Chemical-mechanical polishing ("CMP") processes are widely used to remove material from the surface of a substrate in the production of a wide variety of microelectronics. In a typical CMP process, the surface to be polished is pressed against a polishing pad in the presence of a slurry under controlled chemical, pressure, velocity, and temperature conditions. The slurry generally contains small, abrasive particles that abrade the surface, and chemicals that etch and/or oxidize the newly formed surface. The polishing pad is generally a planar pad made from a continuous phase matrix material such as polyurethane. Thus, when the pad and/or substrate moves with respect to the other, material is removed from the substrate surface mechanically by the abrasive particles and chemically by the etchants and/or oxidants in the slurry.

FIG. 1 schematically illustrates a polishing machine 10, often called a planarizer, used in a conventional CMP process. The polishing machine 10 has a platen 20, substrate carrier 30, a polishing pad 40, and a slurry 44 on the polishing pad. An under-pad 25 is typically attached to the upper surface 22 of platen 20, and the polishing pad 40 is positioned on the under-pad 25. In conventional CMP machines, a drive assembly 26 rotates the platen 20 as indicated by arrow A. In other existing CMP machines, the drive assembly 26 reciprocates the platen 20 back and forth as indicated by arrow B. The motion of the platen 20 is imparted to the pad 40 through the under-pad 25 because the polishing pad 40 frictionally engages the under-pad 25. The substrate carrier 30 has a lower surface 32 to which a substrate 12 may be attached, or the substrate 12 may be attached to a resilient pad 34 positioned between the substrate 12 and the lower surface 32. The substrate carrier 30 may be a weighted, free-floating carrier, or an actuator assembly 36 may be attached to carrier 30 to impart axial and rotational motion, as indicated by arrows C and D, respectively.

In the operation of the conventional polishing machine 10, the substrate 12 is positioned face-downward against the polishing pad 40, and then the platen 20 and the carrier 30 move relative to one another. As the surface of the substrate 12 moves across the planarizing surface 42 of the polishing pad 40, the polishing pad 40 and the slurry 44 polish the surface of the substrate.

CMP processes must consistently and accurately produce a uniform, planar surface. The necessity of obtaining a highly uniform, planar surface is illustrated in the manufacture of microelectronic devices manufactured on a substrate made from glass or a suitable semiconductive material (e.g., silicon) on a suitable insulating material (e.g., glass). Such microelectronic devices typically have many small components formed in multiple layers of materials. One type of microelectronic device particularly relevant to the present invention is a field emission display ("FED").

FEDs are one type of flat panel display in use or proposed for use in computers, television sets, camcorder viewfinders, and a variety of other applications. FEDs have a baseplate with a generally planar emitter substrate juxtaposed to a faceplate. FIG. 2 illustrates a portion of a conventional FED baseplate 20 with a conductive emitter substrate 30, and a number of emitters 32 formed on the emitter substrate 30. An insulator layer 40 made from a dielectric material is disposed on the emitter substrate 30, and an extraction grid 50 made from polysilicon is disposed on the on the insulator layer 40. A number of cavities 42 extend through the insulator layer 40, and a number of holes 52 extend through the extraction grid 50. The cavities 42 and the holes 52 are aligned with the emitters 32 to open the emitters 32 to the faceplate (not shown).

Referring to FIGS. 2 and 3, the emitters 32 are grouped into discrete emitter sets 33 in which the bases of the emitters 32 in each set are commonly connected. As shown in FIG. 3, for example, the emitter sets 33 are configured into rows (e.g., $R_1$–$R_3$) in which the individual emitter sets 33 in each row are commonly connected. Additionally, each emitter set 33 has a grid structure superjacent to the emitters that is configured into columns (e.g, $C_1$–$C_2$) in which the individual grid structures are commonly connected in each column. Such an arrangement allows an X-Y addressable array of grid-controlled emitter sets. The two terminals, comprising the emitters and the grids, of the three terminal cold cathode emitter structure (where the third terminal is understood to be the anode disposed on the faceplate—not shown in FIG. 2 or 3) are commonly connected along such rows and columns, respectively, by means of high-speed interconnects. The interconnects 60 (also shown in FIG. 2) are formed on top of the emitter substrate 30 and the extraction grid 50, and they serve to electrically connect the individual grid structures forming the columns. It will be appreciated that the column and row assignments were chosen for illustrative purposes and can be exchanged.

In operation, a specific emitter set is selectively activated by producing a voltage differential between the extraction grid and the specific emitter set. A voltage differential may be selectively established between the extraction grid and a specific emitter set through corresponding drive circuitry that generates row and column signals that intersect at the location of the specific emitter set. Referring to FIG. 3, for example, a row signal along row $R_2$ of the extraction grid 50 and a column signal along a column $C_1$ of emitter sets 33 activates the emitter set at the intersection of row $R_2$ and column $C_1$. The voltage differential between the extraction grid and the selectively activated emitter sets produces localized electric fields that extract electrons from the emitters in the activated emitter sets.

The display screen of the faceplate (not shown) is coated with a substantially transparent conductive material to form an anode, and the anode is coated with a cathodoluminescent layer. The anode, which is typically biased to approximately 1.0–2.0 kV, draws the extracted electrons through the extraction grid and across a vacuum gap (not shown) between the extraction grid and the cathodoluminescent layer of material. As the electrons strike the cathodoluminescent layer, light emits from the impact site and travels through the anode and the glass panel of the display screen. The emitted light from each of the areas becomes all or part of a picture element.

FIGS. 4A–4C illustrate a prior art method for forming an FED baseplate 120. FIG. 4A illustrates an initial step in which a plurality of emitters 32 are formed on an emitter substrate 30. The emitters 32 are preferably grouped into discrete emitter sets, and the emitter sets are preferably configured into columns or rows on the emitter substrate 30, as discussed above with respect to FIG. 3. The emitters 32 are preferably conical-shaped protuberances that project upwardly from the emitter substrate 30 towards a faceplate (not shown). The shape of the emitters 32, however, is not limited to conical protuberances and may be any other suitable shape. The emitter substrate 30 is typically made from conductive silicon. Alternatively, the emitters 32 may be formed from a conductive layer (not shown) that was deposited on an insulating substrate such as glass.

FIG. 4B illustrates a subsequent stage in the method for forming the FED baseplate 120. After the emitters 32 are formed on the emitter substrate 30, an insulator layer 40 is deposited over the emitter substrate 30 so that the insulator layer 40 generally conforms to the contour of the emitters 32 and the false-emitter defect 34. A unitary interconnect/grid layer 70, which is preferably made from a material having a conductivity sufficient to operate the FED at a refresh rate of 60 Hz, is then deposited over the insulator layer 40. Suitable materials from which the interconnect/grid layer 70 may be made include, but are not limited to, aluminum, copper, or tungsten. The interconnect/grid layer 70 is preferably deposited to a thickness of 0.5 to 5.0 $\mu$m. Since, the interconnect/grid layer 70 is deposited over the insulator layer 40 before the insulator layer 40 is planarized with a CMP process, the interconnect/grid layer 70 generally conforms to the contour of the insulator layer 40.

The actual conductivity of the interconnect/grid layer 70 depends upon several factors, some of which are: (1) the current draw of the emitters; (2) the inductance and capacitance of the extraction grid; (3) the shape and size of the extraction grid; (4) the number of grey scales of the display; and (5) the color spectrum of the display. In a specific example, which is not intended to limit the scope of the invention, the conductivity value of the interconnect/grid layer 70 is preferably less than or equal to 500 (ohm-cm)$^{-1}$ for a display with the following parameters: (1) an active display area of 12.1 inches as measured across the diagonal; (2) a VGA resolution (640×480 lines); (3) full-on spatial color RGB display format supporting 256 grey scales; (4) a refresh rate of 60 Hz; and (5) a passive drive scheme with horizontal rows addressing the interconnect/grid layer and vertical columns addressing the emitters. In general, since the intersection of an addressed row and column activates the emitters at that particular pixel and the length of time that the emitters are biased controls the grey scale of the particular pixel, the interconnect/grid layer 70 is made from a material having a minimum conductivity sufficient to transmit signals to substantially all commonly connected grid segments with a refresh interval of at least approximately 10–40 $\mu$sec.

FIG. 4C illustrates the baseplate 120 after the interconnect/grid layer 70 and insulator layer 40 have been planarized with a CMP process. To CMP the interconnect/grid layer 70 and the insulator layer 40, the front side of the baseplate 120 is pressed against a chemical-mechanical planarization polishing pad (as discussed above) in the presence of a slurry under controlled chemical, pressure, velocity and temperature conditions. The slurry generally contains small, abrasive particles that abrade the front face of the baseplate, and chemicals that etch and/or oxidize the materials on the front face of the baseplate. The polishing pad is generally a planar pad made from a continuous phase matrix material, and abrasive particles may be suspended in the matrix material. Thus, when the pad and/or the baseplate move with respect to the other, material is removed from the front surface of the baseplate mechanically by the abrasive particles and chemically by the etchants and/or oxidants.

The CMP process is endpointed (see FIG. 4C) so that a number of holes or openings 72 are formed in the interconnect/grid layer 70 over the emitters 32 without exposing the tips 36 of the emitters 32. This method of FED manufacture is known as self-aligned CMP-FED fabrication process. FIG. 5 illustrates a completed baseplate 120 with a number of cavities 42 formed in the insulator layer 40 adjacent to the emitters 32. The cavities 42 are preferably formed by a subsequent wet etch process that is selective to the material of the insulator layer 40.

Referring again to FIG. 4B, the CMP process should have a high disparity between polish rates on structured surfaces versus smooth surface. In other words, during the CMP process, it is desirable to have the highest peaks, designated 80 in FIG. 4B, polished at a higher rate than the valleys between peaks, designated 82. In this manner, planarization efficiency is very high, permitting large surface areas to be effectively polished to endpoint by CMP processes.

Accordingly, there is a need in the art for an improved polishing method which permits highly efficient CMP planarization, particularly in the context of FED manufacturing, and which provides well-controlled polish rate across large surface areas. The present invention fulfills this need, and provides further related advantages.

SUMMARY OF THE INVENTION

The invention provides a method for polishing the grid of an FED utilizing an aqueous polishing slurry containing very small colloidal particles of amorphous silica in an alkaline medium. The polishing slurry of this invention yields highly selective planarization—that is, the small colloidal particles in an alkaline medium provide a well-controlled polish rate across large areas, and with a very high disparity between the polish rates on structured versus smooth surfaces, allowing large surfaces to be polished to endpoint effectively.

In the practice of this invention, the polishing slurry is preferably used to polish the grid of in the context of a self-aligned, CMP-FED fabrication process. The polishing slurry contains 20% to 50% by weight colloidal particles of amorphous silica having an average diameter ranging from about 12 $\mu$m to about 50 $\mu$m, and a sufficient amount of an alkaline compound to such that the pH of said slurry is above about 9.5. In one embodiment, the polishing slurry further contains an ammonia stabilizer.

In a further aspect, a CMP-FED grid is disclosed made according to the method of this invention.

These and other aspects of the will be evidence upon reference to the attached figures and following detailed description.

DETAILED DESCRIPTION OF THE INVENTION

As mentioned above, this invention provides a method for using a polishing slurry in chemical-mechanical polishing (CMP), particularly in the fabrication of a field emission display (FED). It has been surprisingly discovered that a polishing slurry containing small colloidal particles in an alkaline medium provide a well-controlled polish rate across large surface areas. The disparity between polish rates on structured versus smooth surfaces (i.e., the planarization efficiency) is very high, allowing large surface areas to effectively be polished to endpoint.

In the practice of this invention, and as discussed in greater detail below, a preferred polishing slurry is sold commercially under the product designation 30N25 by Solutions Technology, Inc. (Monroe, N.C.). Such polishing solutions typically contain small colloidal particles of amorphous silica having an average diameter of about 25 $\mu$m in an alkaline medium having a pH of about 10.

More generally, polishing solutions of this invention are aqueous solutions contain a suitable amount of a base such that the pH of the solution is above about 9.5, and preferably from about 10.5 to about 11.5. Suitable bases include, but are not limited to, potassium hydroxide and sodium hydroxide. The polishing solutions also contain small colloidal particles of amorphous silica having a diameter ranging from about 12 nm to about 50 nm, and preferably about 25 nm. The colloidal particles are present in the polishing slurry in an amount ranging from 20% to 50% by weight, and typically about 30% by weight The polishing slurry of the invention may optionally contain further components, such as a stabilizer. In one embodiment, the optional component is an ammonium ion stabilizer or tetramethylammonium hydroxide (TMAH).

A polishing slurry of this invention may be prepared by combining (e.g., mixing) the components set forth above, or by utilizing commercially available slurries. Representative polishing slurries of this invention may be purchased commercially from Solutions Technology, Inc. (Monroe, N.C.) under the product name KEBOSOL® and product numbers "30 N 50 pHN", "30 N 25" and "PL 1506". Such slurries are opalescent liquids characterized as colloidal suspensions of amorphous silica in alkaline medium, with a solids concentration of about 30% by weight and an average particle size of 50 nm for 30 N 50 pHN and PL 1506, and 25 nm for 30 N 25. The stabilizer in all three products is ammonia, with a $NH_3$ content of 0.1% to 0.3% by weight, and the manufacturing base is sodium silicate for 30 N 50 pHN and 30 N 25, and potassium silicate for PL 1506. The pH of these slurries is 11, 9.5–10.5 and 10.5–11.0 for 30 N 50 pHN, 30 N 25 and PL 1506, respectively.

Figure 4A:
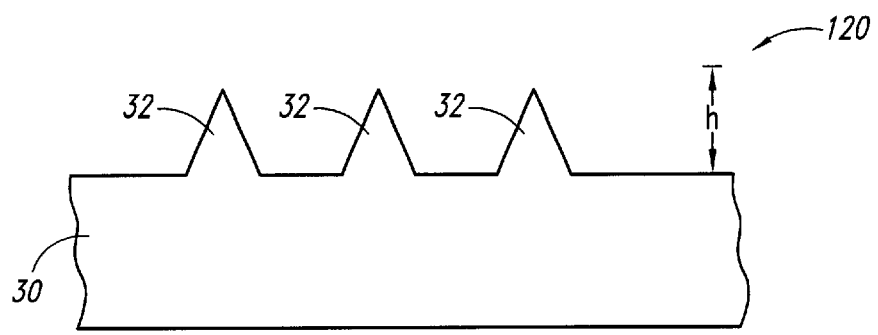
FIG. 4A is a partial schematic cross-sectional view of an FED baseplate at one point in a method for making the baseplate.
Figure 4B:
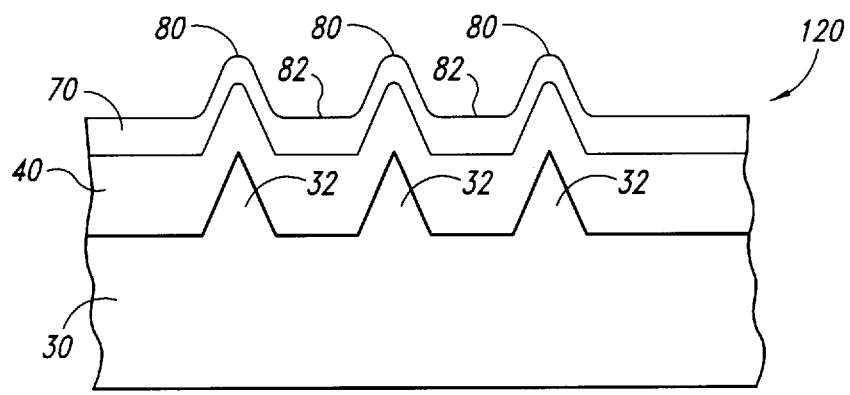
FIG. 4B is a partial schematic cross-sectional view of the FED baseplate of FIG. 4A at another point in a method for making the baseplate.
Figure 4C:
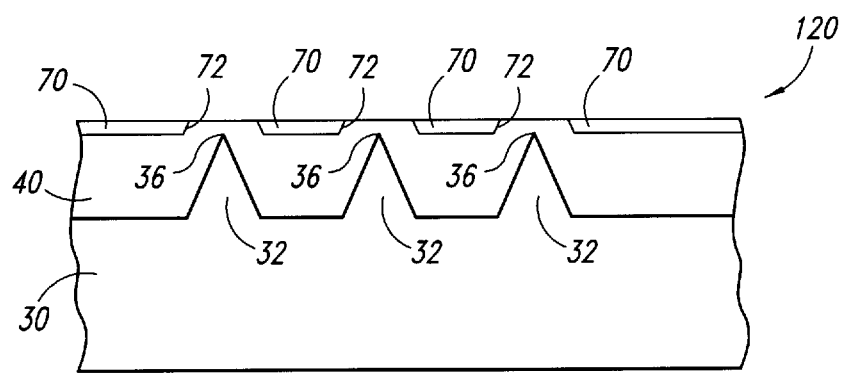
FIG. 4C is a partial schematic cross-sectional view of the FED baseplate of FIG. 4B at another point in a method for making the baseplate.
Figure 5:
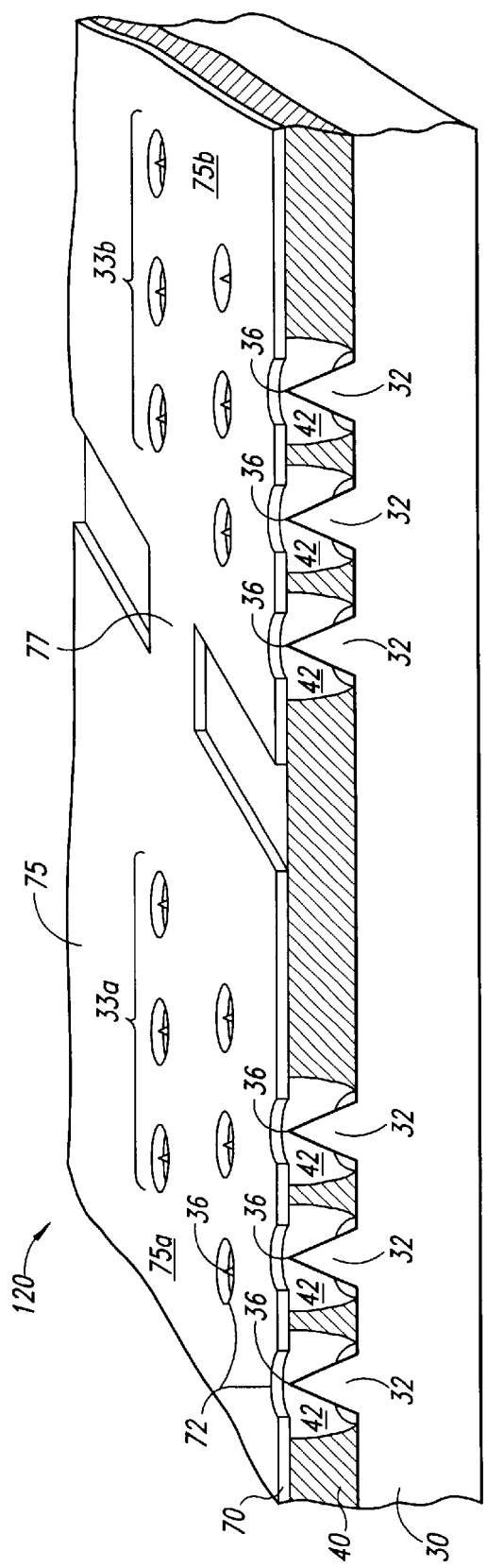
FIG. 5 is an partial isometric view of the of the FED baseplate of FIG. 4C.

While not intending to be bound by the following theory, it is believed that the finer sized particles which are in suspension (and thus not susceptible to clumping) are more effective at polishing the CMP-FED topography. To this end, it has been found that polishing the 1.0–1.5 $\mu$m high points or "bumps" (see peaks 80 of FIG. 4B) is best accomplished with particles sized 40–100 times smaller compared to existing large particle slurries, where the particle diameter of existing slurries approaches the size of the CMP-FED bump.

Figure 1:
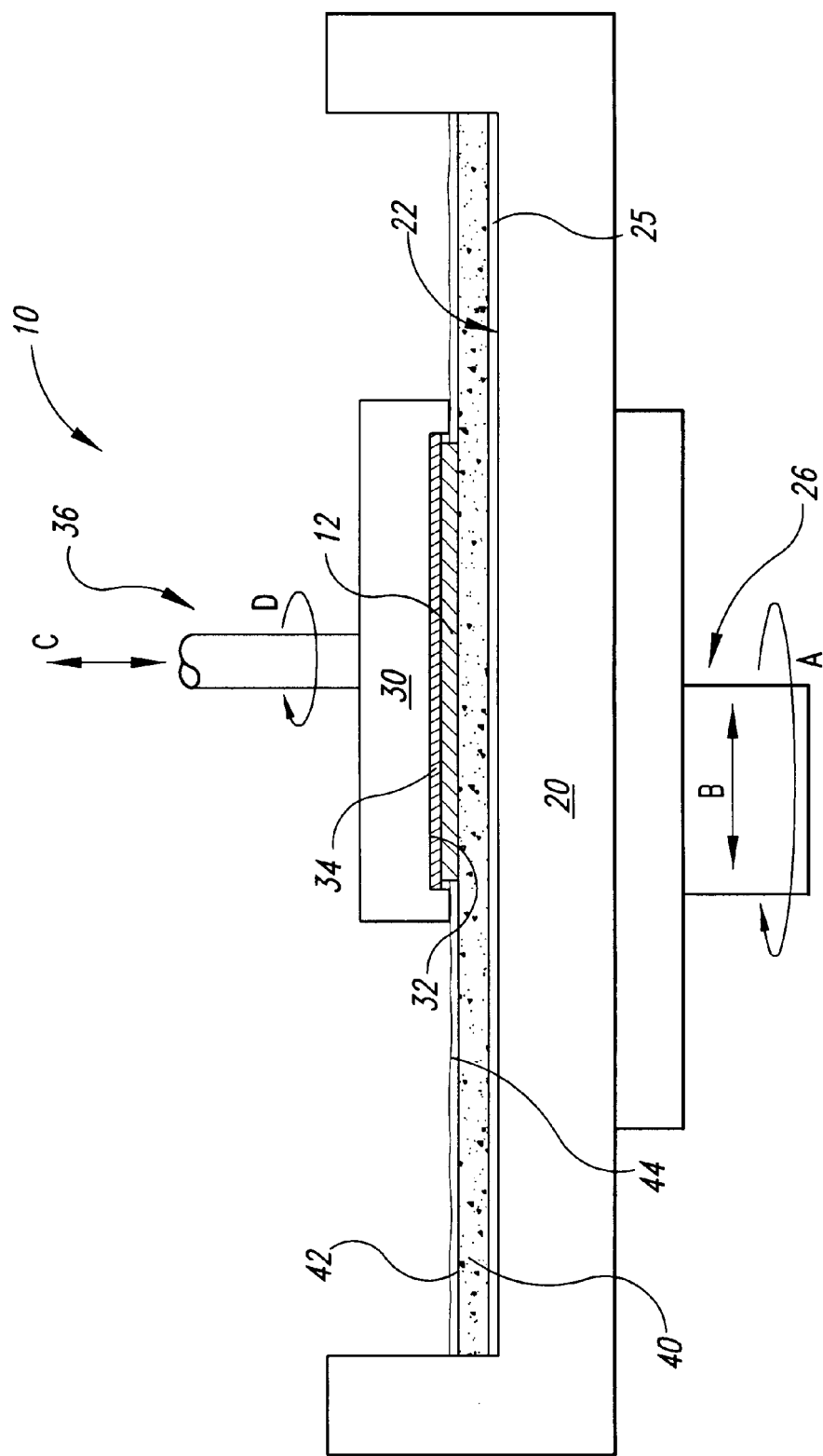
FIG. 1 is a schematic cross-sectional view of a chemical-mechanical planarization machine in accordance with the prior art.
Figure 2:
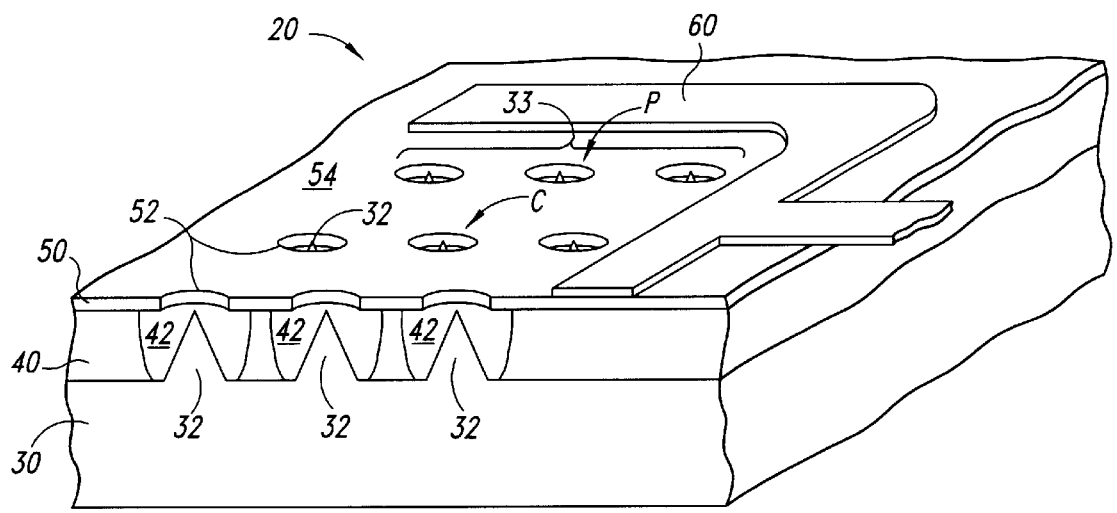
FIG. 2 is a partial schematic isometric view of an FED baseplate in accordance with the prior art.
Figure 3:
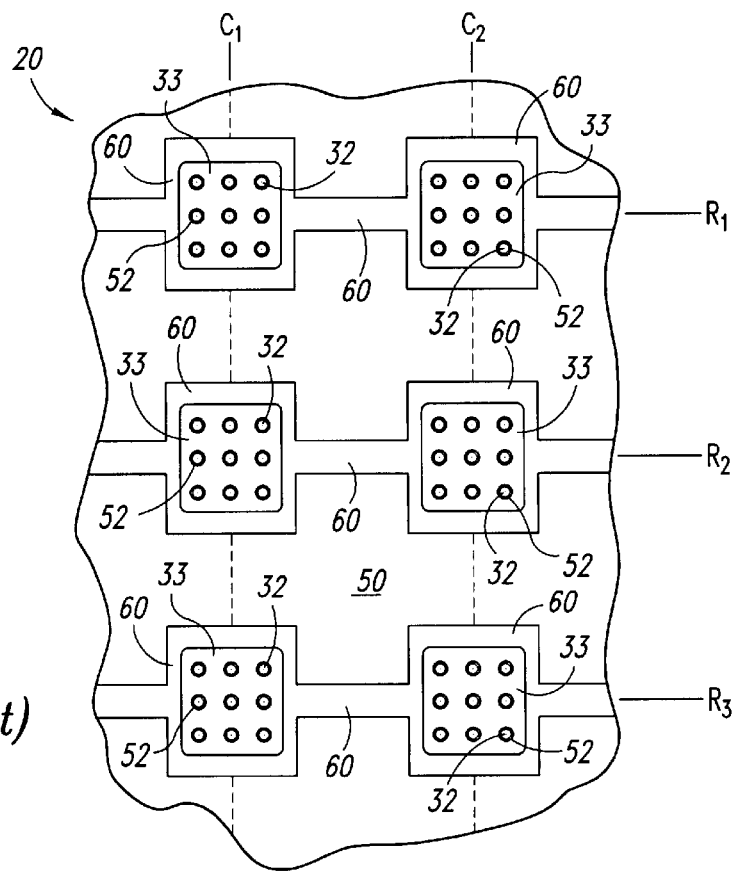
FIG. 3 is a partial plan view of the FED baseplate of FIG. 2 in accordance with the prior art.

Accordingly, in the practice of this invention, the above slurry is employed in the polishing of an FED surface in a CMP process. To this end, the surface to be polished is pressed against the polishing surface of polishing pad 40, as shown on the CMP machine 10 in FIG. 1. The down-force between the surface and the polishing surface of the polishing pad is typically between 5 and 50 psi. The polishing slurry is deposited on the polishing pad, and the surface and polishing pad are moved with respect to each other to impart relative motion therebetween. As the surface and the polishing pad move with respect to one another, the polishing pad and polishing slurry results in a high planarization efficiency—that is, the polishing rate between the high points on the surface (see peaks 80 of FIG. 4B) are polished at a much higher rate than the low points on the surface (see valleys 82 of FIG. 4B), which permits relatively large surfaces of the FED to be effectively polished to end point.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for chemical-mechanical polishing of a field emission display grid, comprising polishing said grid with an aqueous polishing slurry containing 20% to 50% by weight colloidal particles of amorphous silica having an average diameter ranging from about 12 nm to about 50 nm, and a sufficient amount of an alkaline compound to such that the pH of said slurry is above about 9.5.

2. The method of claim 1 wherein the colloidal particles have an average diameter of about 25 nm.

3. The method of claim 1 where the aqueous polishing slurry comprises about 30% by weight colloidal particles.

4. The method of claim 1 wherein the alkaline compound is selected from potassium hydroxide and sodium hydroxide.

5. The method of claim 1 wherein the alkaline compound is sodium hydroxide.

6. The method of claim 1 wherein the pH of the slurry ranges from 9.5 to 12.0.

7. The method of claim 1 wherein the pH of the slurry ranges from 10.5 to 11.0.

8. The method of claim 1 wherein the polishing slurry further comprises ammonium ion stabilizer.

9. The method of claim 8 wherein the ammonium ion is present in the slurry in an amount ranging from about 0.1% to 0.3% by weight.

10. A method for chemical-mechanical polishing of a field emission display grid, comprising polishing said grid with an aqueous polishing slurry containing about 30% by weight colloidal particles of amorphous silica having an average diameter of about 25 nm, an ammonium ion stabilizer, and a sufficient amount of an alkaline compound such that the pH of said slurry ranges from 9.5–11.0.

11. A polished field emission display grid made according to the method of any one of claims 1–10.

* * * * *

UNITED STATES PATENT AND TRADEMARK OFFICE
CERTIFICATE OF CORRECTION

PATENT NO. : 6,271,139 B1
DATED : August 7, 2001
INVENTOR(S) : James J. Alwan and Craig M. Carpenter It is certified that error appears in the above-identified patent and that said Letters Patent is hereby corrected as shown below:

<u>Title page,</u>
Item [56], References Cited, U.S. PATENT DOCUMENTS, please add:

| | | | |
|---|---|---|---|
| -- 4,339,340 | 7/13/82 | Muraoka et al. | 252/79.5 |
| 4,581,101 | 4/8/86 | Senoue et al. | 156/643 |
| 4,722,883 | 2/2/88 | Koibuchi et al. | 430/323 |
| 4,807,016 | 2/21/89 | Douglas | 357/67 |
| 4,910,155 | 3/20/90 | Cote et al. | 437/8 |
| 4,940,916 | 7/10/90 | Borel et al. | 313/306 |
| 4,954,142 | 9/4/90 | Carr et al. | 51/309 |
| 5,186,670 | 2/16/93 | Doan et al. | 445/24 |
| 5,210,472 | 5/11/93 | Casper et al. | 315/349 |
| 5,229,331 | 7/20/93 | Doan et al. | 437/228 |
| 5,240,878 | 8/31/93 | Fitzsimmons et al. | 437/187 |
| 5,252,881 | 10/12/93 | Muller et al. | 310/309 |
| 5,259,799 | 11/9/93 | Doan et al. | 445/24 |
| 5,300,155 | 4/5/94 | Sandhu et al. | 148/33 |
| 5,300,463 | 4/5/94 | Cathey et al. | 437/228 |
| 5,318,927 | 6/7/94 | Sandhu et al. | 437/225 |
| 5,340,370 | 8/23/94 | Cadien et al. | 51/308 |
| 5,354,490 | 10/11/94 | Yu et al. | 252/79.1 |
| 5,366,542 | 11/22/94 | Yamada et al. | 106/3 |
| 5,372,973 | 12/13/94 | Doan et al. | 437/228 |
| 5,389,194 | 2/14/95 | Rostoker et al. | 156/636 |
| 5,407,526 | 4/18/95 | Danielson et al. | 156/636 |
| 5,445,107 | 8/29/95 | Roth et al. | 117/8 |
| 5,448,097 | 9/5/95 | Mizushima et al. | 257/435 |
| 5,478,436 | 12/26/95 | Winebarger et al. | 156/636.1 |
| 5,620,350 | 4/15/97 | Takemura | 445/50 |
| 5,629,580 | 5/13/97 | Mandelman et al. | 313/310 |
| 5,735,963 | 4/7/97 | Obeng | 134/3 -- |

FOREIGN PATENT DOCUMENTS
-- 54-7092      10/18/80    Japan
04 278921       8/5/94      Japan
DD 208886 A1    11/4/84     GDR
EP 610 532 A2   6/15/94     EPO --

UNITED STATES PATENT AND TRADEMARK OFFICE
CERTIFICATE OF CORRECTION

PATENT NO.    : 6,271,139 B1
DATED         : August 7, 2001
INVENTOR(S)   : James J. Alwan and Craig M. Carpenter It is certified that error appears in the above-identified patent and that said Letters Patent is hereby corrected as shown below:

OTHER PUBLICATIONS,
-- Wolf and Tauber, "Silicon Processing For The VLSI Era Volume 1: Process Technology," Lattice Press, Sunset Beach, California, 1986, pp.xi-xxiv, 1986 --

Signed and Sealed this

Eighth Day of October, 2002

Attest:

Attesting Officer

JAMES E. ROGAN
Director of the United States Patent and Trademark Office